(12) United States Patent
Daimon et al.

(10) Patent No.: US 12,352,989 B2
(45) Date of Patent: Jul. 8, 2025

(54) LIGHT-EMITTING DISPLAY DEVICE, AND A LIGHT-BLOCKING LAYER-EQUIPPED FIBER SHEET FOR USE IN LIGHT-EMITTING DISPLAY DEVICE

(71) Applicant: KURARAY CO., LTD., Kurashiki (JP)

(72) Inventors: Tatsuya Daimon, Tsukuba (JP); Toshiyuki Ito, Tokyo (JP); Daisuke Eguchi, Tokyo (JP)

(73) Assignee: KURARAY CO., LTD., Kurashiki (JP)

( * ) Notice: Subject to any disclaimer, the term of this patent is extended or adjusted under 35 U.S.C. 154(b) by 547 days.

(21) Appl. No.: 17/757,878

(22) PCT Filed: Dec. 16, 2020

(86) PCT No.: PCT/JP2020/047052
§ 371 (c)(1),
(2) Date: Jun. 22, 2022

(87) PCT Pub. No.: WO2021/131989
PCT Pub. Date: Jul. 1, 2021

(65) Prior Publication Data
US 2023/0053585 A1 Feb. 23, 2023

(30) Foreign Application Priority Data

Dec. 25, 2019 (JP) ................ 2019-234293

(51) Int. Cl.
*G02B 5/22* (2006.01)
*D06N 3/00* (2006.01)
(Continued)

(52) U.S. Cl.
CPC .......... *G02B 5/223* (2013.01); *D06N 3/0004* (2013.01); *D06N 3/0011* (2013.01); *D06N 3/14* (2013.01); *H04R 29/008* (2013.01)

(58) Field of Classification Search
CPC ..... G02B 5/223; D06N 3/0004; D06N 3/0011
See application file for complete search history.

(56) References Cited

U.S. PATENT DOCUMENTS

| 4,180,934 A | 1/1980 | Cohen |
| 2021/0115610 A1 | 4/2021 | Matsuda et al. |
| 2023/0120727 A1 | 4/2023 | Eguchi et al. |

FOREIGN PATENT DOCUMENTS

| EP | 4122672 | 1/2023 |
| JP | 2001-277409 | 10/2001 |

(Continued)

OTHER PUBLICATIONS

Google patent translation of jp2016081817a (Year: 2016).*
(Continued)

*Primary Examiner* — Lucy P Chien
(74) *Attorney, Agent, or Firm* — Grüneberg and Myers PLLC

(57) ABSTRACT

A light-emitting display device includes: a light-emitting member; and a light-blocking layer-equipped fiber sheet that covers a light-emitting surface of the light-emitting member. The light-blocking layer-equipped fiber sheet includes a fiber sheet, and a light-blocking layer that is partially printed on at least one surface of the fiber sheet. The surface of the fiber sheet on which the light-blocking layer is formed has an arithmetic mean height Sa of 3 to 20 μm, as measured based on ISO 25178, and the fiber sheet has an apparent density of 0.5 g/cm³ or more.

17 Claims, 9 Drawing Sheets

(51) Int. Cl.
*D06N 3/14* (2006.01)
*H04R 29/00* (2006.01)

(56) References Cited

FOREIGN PATENT DOCUMENTS

| | | |
|---|---|---|
| JP | 2013-177714 | 9/2013 |
| JP | 2014-173203 | 9/2014 |
| JP | 2016-081817 | 5/2016 |
| JP | 2017-133133 | 8/2017 |
| WO | 2019/116812 | 6/2019 |

OTHER PUBLICATIONS

International Search Report dated Mar. 2, 2021, in PCT/JP2020/047052, with English translation, 5 pages.
Written Opinion dated Mar. 2, 2021, in PCT/JP2020/047052, 5 pages.
Extended European Search Report dated Jan. 31, 2024, in European Application No. 20906969.9, 9 pages.

* cited by examiner

LIGHT-EMITTING DISPLAY DEVICE, AND A LIGHT-BLOCKING LAYER-EQUIPPED FIBER SHEET FOR USE IN LIGHT-EMITTING DISPLAY DEVICE

CROSS-REFERENCE TO RELATED APPLICATIONS

This application is the National Stage entry under § 371 of International Application No. PCT/JP2020/047052, filed on Dec. 16, 2020, and which claims the benefit of priority to Japanese Application No. 2019-234293, filed on Dec. 25, 2019. The content of each of these applications is hereby incorporated by reference in its entirety.

TECHNICAL FIELD

The present invention relates to a light-emitting display device that displays a symbol such as a character and an icon, a pattern, and/or an image via light emission, using light emitted from a light-emitting member.

BACKGROUND ART

In recent years, a light-emitting display device has been proposed in which a light-emitting member is covered by a light-transmissive sheet, and the presence of the light-emitting member is made less visible while the light-emitting member is turned off, and a symbol such as a character and an icon, a pattern, and/or an image is allowed to emerge on the surface while a light emitter of the light-emitting member is turned on.

For example, PTL 1 listed below discloses a synthetic leather including a raw fabric, and a skin layer that is made of a polyurethane resin and is stacked on the raw fabric, wherein a portion of the synthetic leather has a visible light transmittance of 0.10 to 11.90% for a wavelength range of 380 to 780 nm. Also, PTL 1 discloses that, in order to partially form a light-blocking region, cardboard cut out in a desired shape is, for example, adhered, sewn, hooked, or welded to the back surface of the raw fabric.

PTL 2 listed below discloses a light-transmissive artificial leather sheet using a transparent or semi-transparent elastomer sheet, wherein a smoke printed layer is provided on a back surface or a front surface of the elastomer sheet, a mask printed layer for causing a character, a figure, or a pattern, or a design including a combination thereof to emerge is provided on an outermost layer that is the back surface of the elastomer sheet, and irregularities in a leather-like pattern are formed on the front surface of the elastomer sheet.

PTL 3 listed below discloses a leather-like light-emitting sheet including a light-emitting member, and a light-transmissive leather-like sheet including a fiber base material, wherein the light-transmissive leather-like sheet is disposed so as to cover the light-emitting member, and light emitted from the light-emitting member is transmitted through a light-transmitting portion formed in at least one region in a surface. PTL 3 also discloses that a fiber base material that includes a non-woven fabric of ultrafine fibers having a fineness of 0.8 dtex or less and an elastic polymer, and that has an apparent density of 0.5 g/cm$^3$ or more is dense and thus has excellent dimensional stability, and the fiber base material is preferable because it is excellent in ease of high-precision processing when a thinned portion that is cut to be thinner than a region corresponding to a non-light-transmitting portion is formed in a region corresponding to the light-transmitting portion. PTL 3 also discloses that a light-blocking layer is formed by coating the fiber base material with a coating liquid containing a colorant, and drying the coating liquid.

CITATION LIST

Patent Literatures

[PTL 1] Japanese Laid-Open Patent Publication No. 2013-177714
[PTL 2] Japanese Laid-Open Patent Publication No. 2014-173203
[PTL 3] Japanese Laid-Open Patent Publication No. 2016-081817

SUMMARY OF INVENTION

Technical Problem

As disclosed in PTL 3, a light-blocking layer-equipped fiber sheet obtained by forming a partial light-blocking region on a light-transmissive fiber sheet of a non-woven fabric, a woven fabric, or the like can be preferably used for production of a light-emitting display device that displays a symbol such as a character and an icon, a pattern, and/or an image via light emission, using light emitted from a light-emitting member. In order to form a partial light-blocking region on a fiber sheet, it is conceivable to use a method in which a light-blocking layer is formed using printing. With such a method, it is possible to easily produce a light-blocking layer-equipped fiber sheet that can be preferably used for a light-emitting display device that displays a symbol such as a character and an icon, a pattern, and/or an image via light emission.

However, when a light-blocking layer for forming a light-blocking region is printed on a conventional fiber sheet, uneven absorption of ink occurs, thus making it difficult to form a light-blocking region having little coating unevenness and a high light-blocking effect.

It is an object of the present invention to provide, in a light-emitting display device that includes a light-blocking layer-equipped fiber sheet having a light-blocking layer formed thereon, a light-blocking layer-equipped fiber sheet including a light-blocking layer that is formed by printing and that has a high light-blocking effect and little coating unevenness.

Solution to Problem

An aspect of the present invention is directed to a light-emitting display device including: a light-emitting member; and a light-blocking layer-equipped fiber sheet that covers a light-emitting surface of the light-emitting member, wherein the light-blocking layer-equipped fiber sheet includes a fiber sheet, and a light-blocking layer that is formed by being partially printed on at least one surface of the fiber sheet, and the surface of the fiber sheet on which the light-blocking layer is formed has an arithmetic mean height Sa of 3 to 20 μm, as measured based on ISO 25178, and the fiber sheet has an apparent density of 0.5 g/cm$^3$ or more. In such a light-emitting display device, when the light-emitting member disposed as a backlight of the light-blocking layer-equipped fiber sheet is caused to emit light, the light emitted from the light-emitting member is selectively blocked to display a symbol such as a character and an icon, a pattern, and/or an image via light emission. On the other hand, when the light-emitting member is not emitting light, the light-emitting member is covered and concealed by the fiber sheet. With the fiber sheet in which the surface on which the light-blocking layer is formed has an arithmetic mean height Sa of 3 to 20 μm, and the fiber sheet has an apparent density of 0.5 g/cm$^3$ or more, a light-blocking layer having a high light-blocking effect and little coating unevenness can be more easily formed through printing.

When the light-blocking layer is printed on a first surface of the fiber sheet, which is located on a side of the light-emitting surface, even if a surface resin layer as described below, or a design surface that has been napped, for example, is formed on a second surface that is located on a side of an outer surface, it is possible to form the light-blocking layer on the fiber sheet without affecting the design surface. When the light-blocking layer is printed on the second surface of the fiber sheet, which is not located on the side of the light-emitting surface, even if a transparent resin molded body as described below is injection molded to the first surface being located on the side of the light-emitting surface so as to be integrated with the first surface, the printed light-blocking layer is less likely to spread or flow by the heat and the pressure applied during the injection molding.

It is preferable that the light-blocking layer-equipped fiber sheet has, on a second surface of the fiber sheet which is not located on the side of the light-emitting surface, a napped surface formed by napping fibers of a surface layer of the second surface, because an appearance of a napped leather such as a suede-like leather can be formed. It is preferable that the light-blocking layer-equipped fiber sheet having the napped surface includes a light-transmitting portion having an average value of light transmittance for a visible wavelength range of 380 to 780 nm, of 5 to 15%, and more preferably 7 to 12%.

It is preferable that the light-blocking layer-equipped fiber sheet further includes a light-transmissive surface resin layer on a second surface of the fiber sheet, which is not located on the side of the light-emitting surface, because an appearance with a luxurious feel such as a grain-finished leather-like feel, a wooden feel, a stony feel, a metallic feel can be provided by selecting the design of the surface resin layer.

It is preferable that the fiber sheet includes a non-woven fabric of ultrafine fibers having a fineness of 1 dtex or less, and 3 to 40 masse of an elastic polymer impregnated into the non-woven fabric, because a fiber sheet having an arithmetic mean height Sa of 3 to 20 μm and an apparent density of 0.5 g/cm$^3$ or more is likely to be obtained.

Another aspect of the present invention is directed to a light-blocking layer-equipped fiber sheet for use in a light-emitting display device configured to cover a light-emitting surface of a light-emitting member and selectively transmit light emitted from the light-emitting member, to display a symbol, a pattern, and/or an image via light emission, the light-blocking layer-equipped fiber sheet including: a fiber sheet having a first surface that is located on a side of the light-emitting surface, and a second surface that is located on a side of an outer surface of the light-emitting display device; and a light-blocking layer that is partially printed on at least one of the first surface and the second surface, wherein the surface of the fiber sheet on which the light-blocking layer is formed has an arithmetic mean height Sa of 3 to 20 μm, as measured based on ISO 25178, and the fiber sheet has an apparent density of 0.5 g/cm$^3$ or more.

Advantageous Effects of Invention

According to the present invention, it is possible to provide, in a light-emitting display device that includes a light-blocking layer-equipped fiber sheet having a light-blocking layer formed thereon, a light-blocking layer-equipped fiber sheet that is formed through printing and that has little coating unevenness and a high light-blocking effect.

DESCRIPTION OF EMBODIMENTS

Embodiments of a light-emitting display device according to the present invention, and a light-blocking layer-equipped fiber sheet used for producing the light-emitting display device will be described.

Figure 1:
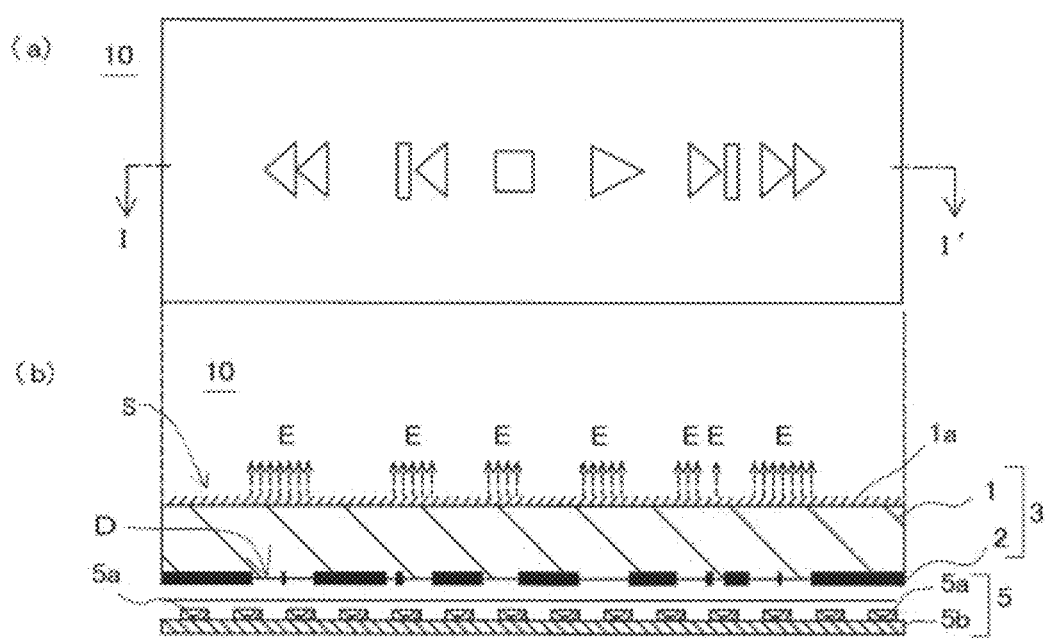
FIG. 1 shows schematic views of a light-emitting display device 10 including a light-blocking layer-equipped fiber sheet 3 according to a first embodiment.

FIG. 1 shows schematic views of a light-emitting display device 10 according to a first embodiment. FIG. 1(a) is a schematic plan view showing a state in which the light-emitting display device 10 is emitting light, and FIG. 1(b) is a schematic cross-sectional view taken along the line I-I' in FIG. 1(a).

Referring to FIG. 1(b), the light-emitting display device 10 includes a light-emitting member 5, and a light-blocking layer-equipped fiber sheet 3 that covers a light-emitting surface of the light-emitting member 5. The light-emitting member 5 is a surface-emitting device including a circuit board 5b and a plurality of light-emitting diode devices (LEDs) 5a mounted thereon. The LEDs 5a of the light-emitting member 5 each emit light in response to power supplied thereto. An image display device such as a light-emitting display device may be used as the light-emitting member. The brightness of the light-emitting member is preferably 20 to 200 lumens, and more preferably 30 to 100 lumens, in view of the fact that it is possible to sufficiently ensure the display performance while maintaining the concealing effect of the light-blocking layer.

Figure 2:
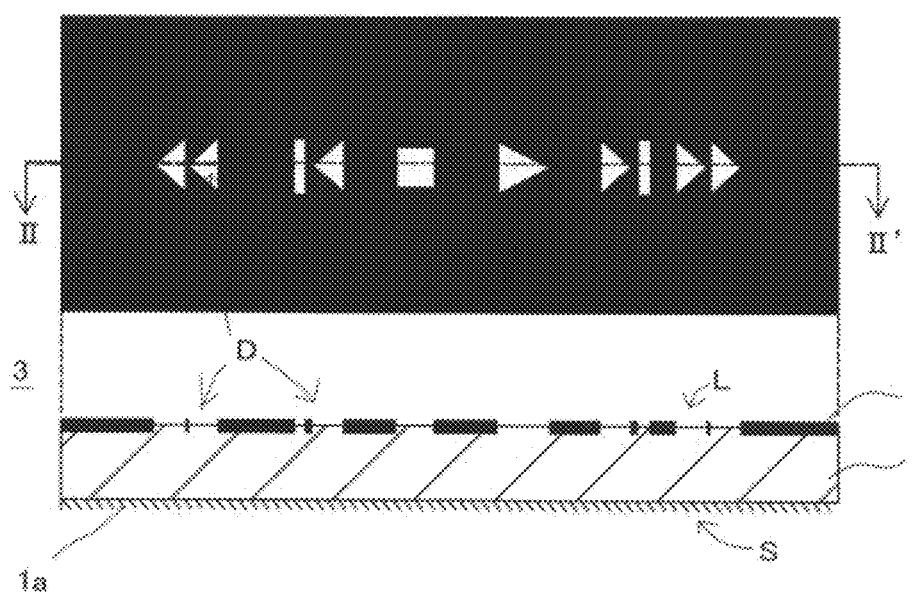
FIG. 2 shows schematic views of the light-blocking layer-equipped fiber sheet 3.

FIG. 2 shows schematic views of the light-blocking layer-equipped fiber sheet 3, which constitutes the light-emitting display device 10. FIG. 2(a) is a schematic plan view of the light-blocking layer-equipped fiber sheet 3, and FIG. 2(b) is a schematic cross-sectional view taken along the line II-II' in FIG. 2(a).

The light-blocking layer-equipped fiber sheet 3 includes a fiber sheet 1 including a fiber structure such as a non-woven fabric, a woven fabric, or a knitted fabric. The fiber sheet 1 has a first surface L, which is located on a side of the light-emitting surface of the light-emitting member 5, and a second surface S, which is located on a side of an outer surface of the light-emitting display device 10. The second surface S is a napped surface 1a that has a suede-like appearance, that has been formed by raising the fibers of a surface layer forming the fiber sheet 1 through buffing.

As shown in FIG. 2(a), light-transmitting portions D that cause symbols of icons representing pause, playback, skip forward, skip back, fast forward, and reverse, which indicate operation states of an audio device, to emerge are formed due to a partially printed light-blocking layer 2 in the light-blocking layer-equipped fiber sheet 3. The design of symbols such as icons and characters, patterns, and images that are to be printed can be freely selected according to the purpose. Note that the expression "partially" means that the light-blocking layer-equipped fiber sheet 3 includes the light-transmitting portions on which the light-blocking layer is not formed.

When light that is emitted from the light-emitting member 5 is applied to the first surface L of the fiber sheet 1, the light enters the light-transmitting portions D on which the light-blocking layer is not formed, then passes through the fiber sheet 1, and exits from the second surface S. As for the light transmission of the fiber sheet 1, the arithmetic mean value of transmittance for a visible wavelength range of 380 to 780 nm is preferably 0.1% or more, more preferably 1.0% or more, particularly preferably 5.0% or more, and quite particularly preferably 10% or more. When the arithmetic mean value of the visible light transmittance of the fiber sheet is too low, symbols such as characters and icons, patterns, and images that are displayed via light emission tend to be obscure. As for the light transmission of the light-blocking layer, the arithmetic mean value of transmittance for a visible wavelength range of 380 to 780 nm is preferably 0.05% or less, and more preferably 0.02% or less.

As described above, in the light-blocking layer-equipped fiber sheet 3, the light-blocking layer 2 in black is formed on portions other than the light-transmitting portions D, which represent symbols of icons indicating the operation states of the audio device, is formed through printing. The light-blocking layer 2 is formed by being printed on a surface of the fiber sheet 1, for example, using an ink such as a pigment ink containing a pigment having a high concealing effect, such as carbon black or titanium oxide, and a binder, or a dye ink containing a dark color dye having a light-blocking effect. In the light-blocking layer-equipped fiber sheet 3, the surface of the fiber sheet 1 on which the light-blocking layer 2 is formed has an arithmetic mean height Sa of 3 to 20 μm. The fiber sheet 1 has an apparent density of 0.5 g/cm or more.

Referring to FIG. 1(b), in the light-emitting display device 10, when a current is applied to the LEDs 5a in the light-emitting member 5 to cause the light-emitting surface to emit light, the light enters from the first surface which is located on a side of the light-emitting surface, and then enters the light-transmitting portions D on which the light-blocking layer 2 is not formed. The light then passes through the fiber sheet 1, and exits, as indicated by the arrows E, from regions of the second surface S, which is located on the side of the outer surface of the light-emitting display device 10, the regions facing regions of the first surface on which the light-blocking layer 2 is not formed. As a result, as shown in FIG. 1(a), the icons illustrating the operation states of the audio device are caused to emerge by the exit light, on the second surface of the light-blocking layer-equipped fiber sheet 3, which is located on the side of the outer surface of the light-emitting display device 10. When the LEDs 5a of the light-emitting member 5 are turned off, the icons are less visible, and the light-emitting member 5 is also less visible from the outside.

Figure 3:
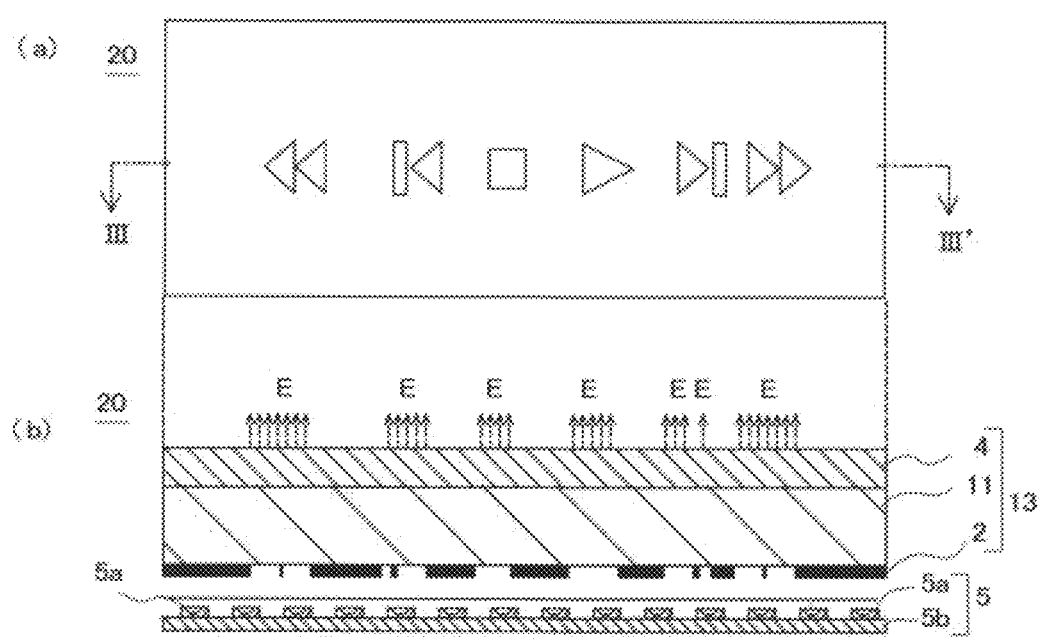
FIG. 3 shows schematic views of a light-emitting display device 20 including a light-blocking layer-equipped fiber sheet 13 according to a second embodiment.

The light-blocking layer-equipped fiber sheet may further include a light-transmissive surface resin layer on the second surface of the fiber sheet which is not located on the side of the light-emitting surface, or in other words, the surface that is located on the side of the outer surface of the light-emitting display device. FIG. 3 shows schematic views of such a light-emitting display device 20 according to a second embodiment. FIG. 3(a) is a schematic plan view showing a state in which the light-emitting display device 20 is emitting light, and FIG. 3(b) is a schematic cross-sectional view taken along the line III-III' in FIG. 3(a).

Figure 4:
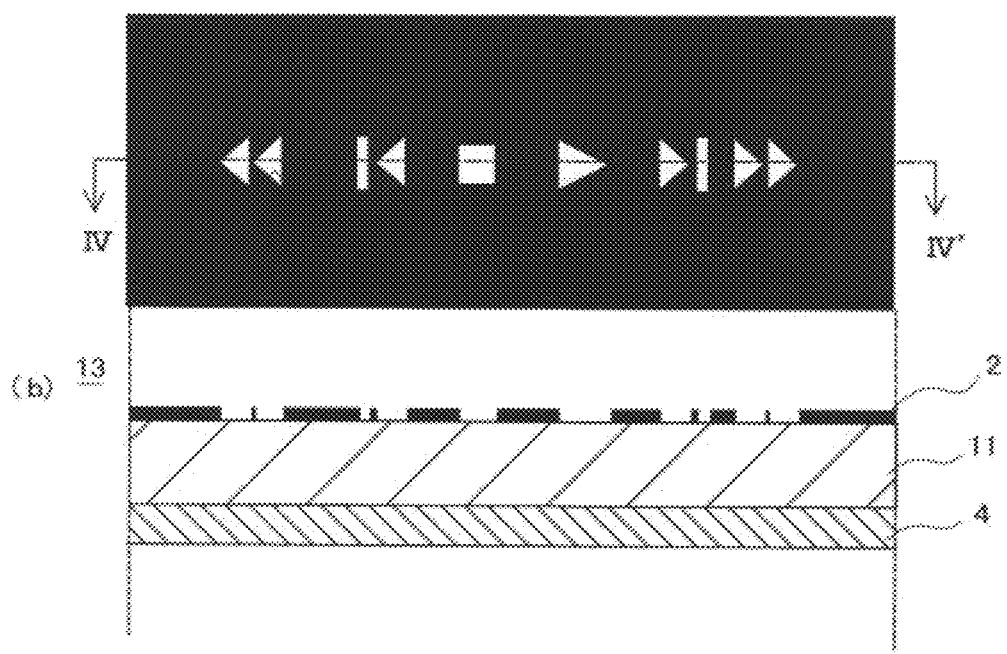
FIG. 4 shows schematic views of the light-blocking layer-equipped fiber sheet 13.

Referring to FIG. 3(b), the light-emitting display device 20 includes a light-emitting member 5, and a light-blocking layer-equipped fiber sheet 13 that covers a light-emitting surface of the light-emitting member 5. The light-emitting member 5 is the same as the light-emitting member 5 according to the first embodiment. FIG. 4 shows schematic views of the light-blocking layer-equipped fiber sheet 13, which constitutes the light-emitting display device 20. FIG. 4(a) shows a schematic plan view of the light-blocking layer-equipped fiber sheet 13, and FIG. 4(b) shows a schematic cross-sectional view taken along the line IV-IV' in FIG. 4(a).

The light-emitting display device 20 according to the second embodiment has the same configuration as the light-emitting display device 10 according to the first embodiment except that the light-blocking layer-equipped fiber sheet 13 in which a light-transmissive surface resin layer 4 is stacked on a second surface of a fiber sheet 11 is used in place of the light-blocking layer-equipped fiber sheet 3 whose second surface of the fiber sheet 1 which is not located on the side of the light-emitting surface is a suede-like napped surface in the light-emitting display device 10 according to the first embodiment.

Figure 5A:
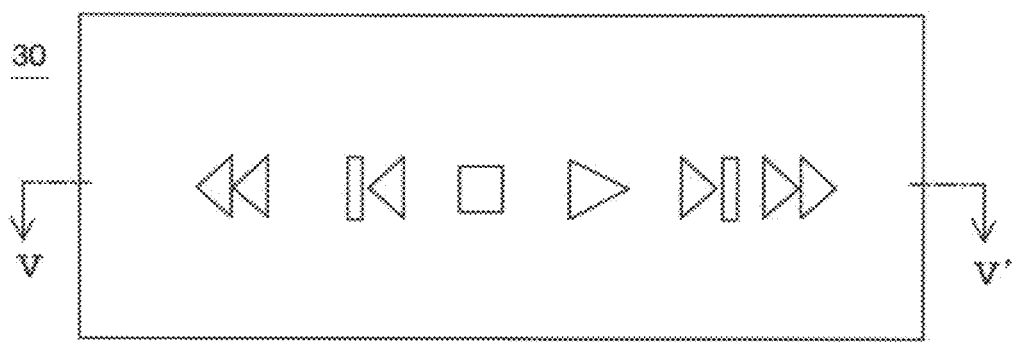
FIGS. 5A and 5B show schematic views of a light-emitting display device 30 including a light-blocking layer-equipped fiber sheet 23 according to a third embodiment.
Figure 5B:
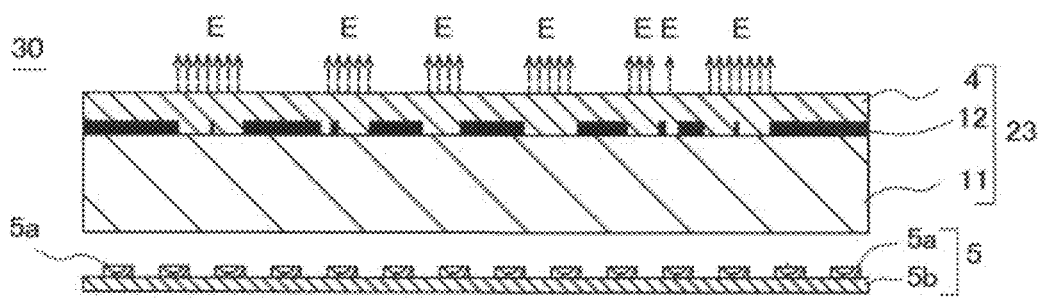

The light-blocking layer-equipped fiber sheet may include a light-blocking layer on the second surface of the fiber sheet, which is not located on the side of the light-emitting surface, or in other words, the surface that is located on the side of the outer surface of the light-emitting display device. FIGS. 5A and 5B show schematic views of such a light-emitting display device 30 according to a third embodiment. FIG. 5A is a schematic plan view showing a state in which the light-emitting display device 30 is emitting light, and FIG. 5B is a schematic cross-sectional view taken along the line V-V' in FIG. 5A.

Figure 6:
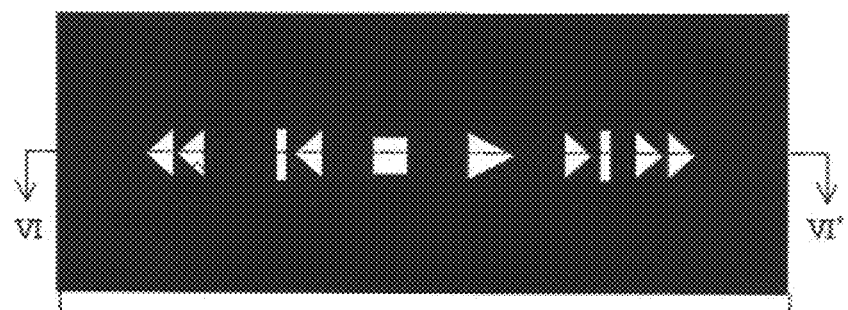
FIG. 6 shows schematic views of the light-blocking layer-equipped fiber sheet 23.
Figure 6:
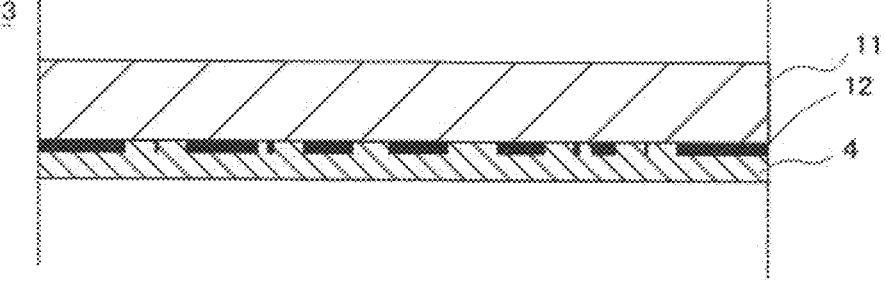

Referring to FIG. 5B, the light-emitting display device 30 according to the third embodiment includes a light-emitting member 5, and a light-blocking layer-equipped fiber sheet 23 that covers a light-emitting surface of the light-emitting member 5. The light-emitting member 5 is the same as the light-emitting member 5 according to the first embodiment. FIG. 6 shows schematic views of the light-blocking layer-equipped fiber sheet 23, which constitutes the light-emitting display device 30. FIG. 6(a) shows a schematic plan view of the light-blocking layer-equipped fiber sheet 23, and FIG. 6(b) shows a schematic cross-sectional view taken along the line VI-VI' in FIG. 6(a).

The light-emitting display device 30 according to the third embodiment has the same configuration as the light-emitting display device 20 according to the second embodiment except that the light-blocking layer-equipped fiber sheet 23 in which a light-blocking layer 12 is formed on the second surface of the fiber sheet 11, which is not located on the side of the light-emitting surface, is used instead of forming the light-blocking layer 2 on the first surface of the fiber sheet 11, which is located on the side of the light-emitting surface, in the light-emitting display device 20 according to the second embodiment.

With the light-emitting display device 30 according to the third embodiment, as shown in FIGS. 5A, 5B and 6, which uses the light-blocking layer-equipped fiber sheet 23 in which the light-blocking layer 12 is formed on the second surface of the fiber sheet 11, which is not located on the side of the light-emitting surface, the light-blocking layer 12 is formed at a position close to the outer surface of the light-emitting display device 30. Accordingly, the contour of the light emission E is sharp. In the case of the light-emitting display device 10 and the light-emitting display device 20 according to the first embodiment and the second embodiment, light that has entered from the light-blocking layer 2 is diffused inside the fiber sheet 1 or 11, so that the contour of the light emission E tends to be slightly more obscure than in the case of the light-emitting display device 30 according to the third embodiment.

A light-emitting display device 40 according to a fourth embodiment has the same configuration as the light-emitting display device 20 according to the second embodiment except for using a light-blocking layer-equipped fiber sheet 33 in which the light-blocking layer 2 is formed on the first surface of the fiber sheet 11, which is located on the side of the light-emitting surface, and the light-blocking layer 12 is also formed on the second surface of the fiber sheet 11, which is not located on the side of the light-emitting surface, in the light-emitting display device 20 according to the second embodiment.

Figure 7A:
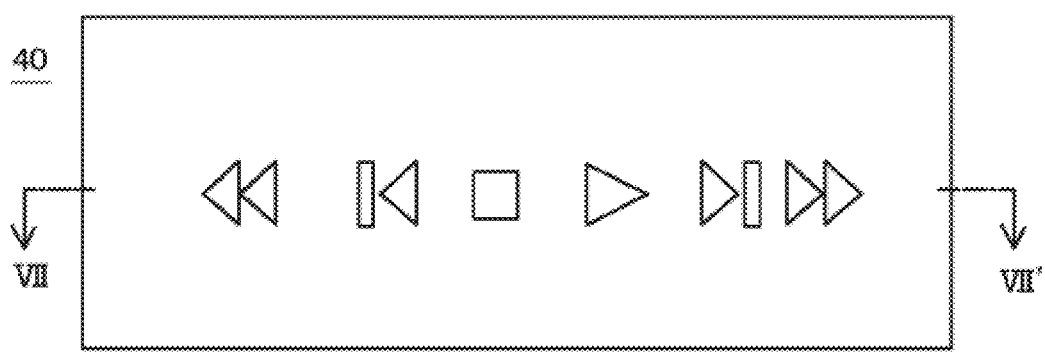
FIGS. 7A and 7B show schematic views of a light-emitting display device 40 including a light-blocking layer-equipped fiber sheet 33 according to a fourth embodiment.
Figure 7B:
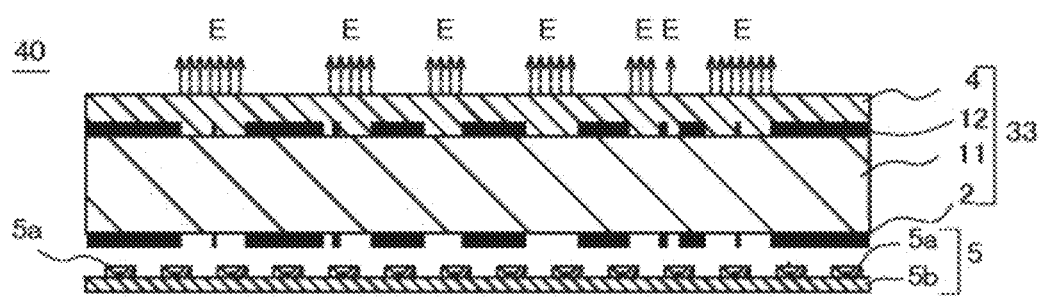
Figure 8:
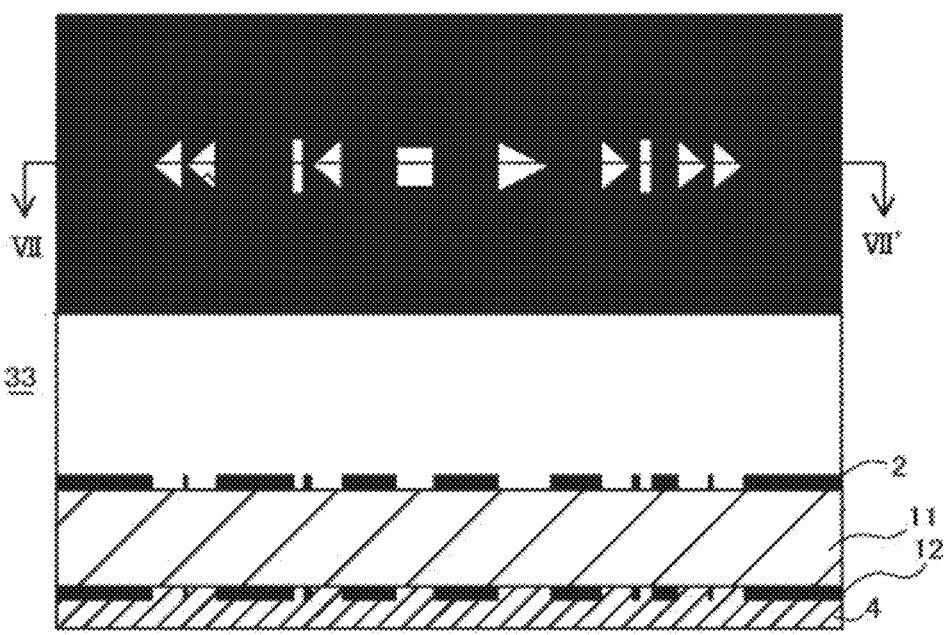
FIG. 8 shows schematic views of the light-blocking layer-equipped fiber sheet 33.

The light-emitting display device 40 according to the fourth embodiment, as shown in FIGS. 7A, 7B and 8, which uses a light-blocking layer-equipped fiber sheet 33 in which the light-blocking layer 12 is formed on both the first surface of the fiber sheet 11, which is located on the side of the light-emitting surface, and the second surface of the fiber sheet 11, which is not located on the side of the light-emitting surface, realizes the following light emission. The first surface increases the directivity of the incident light owing to the light-blocking layer 2. Additionally, as in the case of the light-emitting display device 30 of the third embodiment, as a result of forming the light-blocking layer 12 on the second surface that is close to the outer surface, the contour of the light emission E is clearer than in the case of the light-emitting display device 30. When the light-blocking layer of the first surface and the light-blocking layer of the second surface are designed differently from each other, it is possible to provide a design with a high degree of freedom.

The outline of the basic configurations of the light-emitting display devices according to the first to fourth embodiments has been described above. Next, the light-blocking layer-equipped fiber sheet, which is a feature of the light-emitting display devices according to the embodiments, will be described in detail in conjunction with a production method thereof.

The fiber sheet used for producing the light-blocking layer-equipped fiber sheet includes a fiber structure such as a non-woven fabric, a woven fabric, or a knitted fabric, and an elastic polymer is impregnated into voids of the fiber structure if necessary. Among the fiber structures, a non-woven fabric, in particular, a non-woven fabric of ultrafine fibers having a fineness of 1 dtex or less is preferable. For the non-woven fabric of ultrafine fibers, the apparent density can be easily increased by increasing the fiber density, and the surface can be easily smoothed by reducing the density unevenness of the fibers. In the following, a case where a fiber base material including a non-woven fabric of ultrafine fibers is used will be described in detail as a representative example.

The non-woven fabric of ultrafine fibers is obtained, for example, by subjecting ultrafine fiber-generating fibers such as island-in-the-sea (matrix-domain) conjugated fibers to entangling, and then to ultrafine fiber-generation. In the present embodiment, a case where island-in-the-sea conjugated fibers are used will be described in detail. Note that, in place of island-in-the-sea conjugated fibers, ultrafine fiber-generating fibers other than island-in-the-sea conjugated fibers may be used, or ultrafine fibers may be spun without using ultrafine fiber-generating fibers. Specific examples of the ultrafine fiber-generating fibers other than island-in-the-sea conjugated fibers include strip/division-type fibers in which a plurality of ultrafine fibers are lightly bonded immediately after being spun, and separated by a mechanical operation, to form a plurality of ultrafine fibers, and petal-shaped fibers obtained by alternately assembling a plurality of resins in a petal shape in a melt spinning process.

In production of a non-woven fabric of ultrafine fibers, first, a thermoplastic resin for forming a sea component (matrix component), which is to be selectively removed, of island-in-the-sea conjugated fibers, and a thermoplastic resin for forming an island component (domain component), which is a resin component for forming ultrafine fibers, of the island-in-the-sea conjugated fibers are melt spun and then drawn, thus producing island-in-the-sea conjugated fibers.

As the thermoplastic resin for the sea component, a thermoplastic resin that differs from the resin for the island component in solubility in a solvent or in decomposability in a decomposition agent is selected. Specific examples of the thermoplastic resin constituting the sea component include water-soluble polyvinyl alcohol-based resins, polyethylene, polypropylene, polystyrene, ethylene-propylene resins, ethylene-vinyl acetate resins, styrene-ethylene resins, and styrene-acrylic resins.

For the thermoplastic resin that defines the island components and that constitutes the resin component forming the ultrafine fibers, any resin capable of forming island-in-the-sea conjugated fibers and ultrafine fibers can be used without any particular limitations. Specific examples include: aromatic polyesters such as polyethylene terephthalate (PET), isophthalic acid-modified PET, sulfoisophthalic acid-modified PET, polybutylene terephthalate, and polyhexamethylene terephthalate; aliphatic polyesters such as polylactic acid, polyethylene succinate, polybutylene succinate, polybutylene succinate adipate, and a polyhydroxybutyrate-polyhydroxyvalerate resin; polyamides such as polyamide 6, polyamide 66, polyamide 10, polyamide 11, polyamide 12, and polyamide 6-12; and polyolefins such as polypropylene, polyethylene, polybutene, polymethylpentene, and a chlorine-based polyolefin. These may be used alone, or in a combination of two or more.

Examples of the production method of the non-woven fabric of ultrafine fibers include a method in which island-in-the-sea conjugated fibers are melt spun to produce a web, and the web is subjected to entangling, and thereafter the sea component is selectively removed from the island-in-the-sea conjugated fibers, to form ultrafine fibers. Examples of the production method of the web include a method in which filaments of the island-in-the-sea conjugated fibers that have been spun by spunbonding or the like are collected on a net, without being cut, to form a filament web, and a method in which filaments are cut into staples to form a staple web. Among these, a filament web is particularly preferable in that the apparent density can be easily increased by increasing the fiber density, and the surface can be easily smoothed by reducing the density unevenness of the fibers. The formed web may be subjected to fusion bonding in order to impart shape stability thereto.

Note that a filament means a continuous fiber, rather than a staple that has been intentionally cut after being spun. More specifically, a filament means a fiber other than a staple that has been intentionally cut so as to have a fiber length of about 3 to 80 mm, for example. The fiber length of the island-in-the-sea conjugated fibers before being subjected to the ultrafine fiber generation is preferably 100 mm or more, and may be several meters, several hundred meters, several kilometers, or more, as long as the fibers are technically producible and are not inevitably cut during the production process. Note that some of the filaments may be inevitably cut into staples during the production process due to needle punching during entanglement, or surface buffing, which will be described later.

In any of the processes until the sea component of the island-in-the-sea conjugated fibers is removed to form ultrafine fibers, entangling and fiber shrinking treatment such as heat shrinking using water vapor may be performed, whereby it is possible to densify the island-in-the-sea conjugated fibers. Examples of entangling include a method in which about 5 to 100 layers of the web are placed on top of each other, and then subjected to needle punching or high-pressure water jetting.

The sea component of the island-in-the-sea conjugated fibers is extracted away by being dissolved or decomposed at an appropriate stage after the web has been formed. Through such removal by decomposition or removal by dissolution, the island-in-the-sea conjugated fibers are formed into ultrafine fibers, and a non-woven fabric of ultrafine fibers in the form of fiber bundles is formed. The non-woven fabric of ultrafine fibers in the form of fiber bundles may be subjected to heat shrinking, hot rolling, or hot pressing to further increase the apparent density.

The fineness of the ultrafine fibers is not particularly limited, but is preferably a fineness of 1 dtex or less, more preferably 0.01 to 0.6 dtex, and particularly preferably 0.02 to 0.5 dtex, because the apparent density is increased due to the fiber density of the ultrafine fibers being likely to be increased, so that the ink used for printing the light-blocking layer is more likely to be permeate into the fiber sheet by capillary action.

If necessary, an elastic polymer may be contained in the voids between the fibers of the fiber structure such as a non-woven fabric for the purpose of providing the shape stability and the fullness. The type of the elastic polymer is not particularly limited. Specific examples thereof include various polyurethanes such as a polycarbonate-based polyurethane, a polyester-based polyurethane, and a polyether-based polyurethane; acrylic elastic bodies; polyurethane acrylic composite elastic bodies; polyvinyl chloride; and synthetic rubbers. Among these, polyurethanes are preferable because of the excellent adhesion and mechanical properties.

Examples of the method for applying the elastic polymer into the fiber structure such as a non-woven fabric include a method involving impregnating a solution or an emulsion of the elastic polymer into the fiber structure, and subsequently coagulating the elastic polymer. As the method for impregnating a solution or an emulsion of the elastic polymer into the fiber structure, it is preferable to use dip-nipping in which a treatment of dipping the fiber structure in the solution or the emulsion so as to achieve a predetermined impregnated state, and nipping the fiber structure using a press roll or the like is performed once or a plurality of times. As another method, it is possible to use bar coating, knife coating, roll coating, comma coating, spray coating, or the like.

It is possible to apply the elastic polymer into the fiber structure by impregnating a solution or an emulsion of the elastic polymer into the fiber structure, and coagulating the elastic polymer.

The content ratio of the elastic polymer in the fiber sheet is preferably 3 to 40 mass %, more preferably 8 to 35 mass %, and particularly preferably 12 to 30 mass %, in view of the fact that the apparent density of the fiber sheet is increased by increasing the fiber density, and the ink used for printing the light-blocking layer is likely to permeate by capillary action.

In this manner, a base material of the fiber sheet is obtained. If necessary, the obtained base material of the fiber sheet is subjected to thickness adjustment through slicing, buffing, or the like.

Then, the base material of the fiber sheet is further pressed, thus adjusting the apparent density. Specifically, the base material of the fiber sheet is pressed at room temperature, or hot pressed under heating to lessen voids in the base material of the fiber sheet, thus increasing the fiber density of the fiber structure. Although means for pressing is not particularly limited, a manual pressing machine or roll pressing is preferably used.

In the case of performing pressing, the pressing pressure is preferably about 5 to 20 MPa, and more preferably 8 to 15 MPa, from the viewpoint of maintaining the appearance quality. In the case of using hot pressing, the set temperature of the heated roll is preferably 100 to 150° C., and more preferably 110 to 120° C., from the viewpoint of maintaining the appearance quality.

In this manner, the apparent density of the base material of the fiber sheet is adjusted. The apparent density of the fiber sheet after pressing is preferably 0.50 g/cm$^3$ or more, more preferably 0.50 to 0.95 g/cm$^3$, and particularly preferably 0.50 to 0.90 g/cm$^3$. When the apparent density of the fiber sheet after pressing is less than 0.50 g/cm$^3$, the amount of permeation of the ink used for printing the light-blocking layer in the thickness direction by capillary action is reduced due to the low fiber density, and thus the ink is likely to be diffused in the plane direction. Accordingly, it is difficult to uniformly apply the ink in such a manner that a light-blocking layer with a high light-blocking effect and little coating unevenness can be formed.

For the base material of the fiber sheet, in order to smooth the surface of the fiber sheet on which the light-blocking layer is to be printed, the surface of the base material of the fiber sheet on which the light-blocking layer is to be printed is preferably smoothed through buffing.

Examples of buffing for smoothing the surface on which the light-blocking layer is to be printed include grinding in which a rotating buff roller having a surface covered with sandpaper is brought into contact with the surface of the base material of the fiber sheet on which the light-blocking layer is to be printed. Through such buffing, the surface of the base material of the fiber sheet on which the light-blocking layer is to be printed is smoothed.

Figure 9:
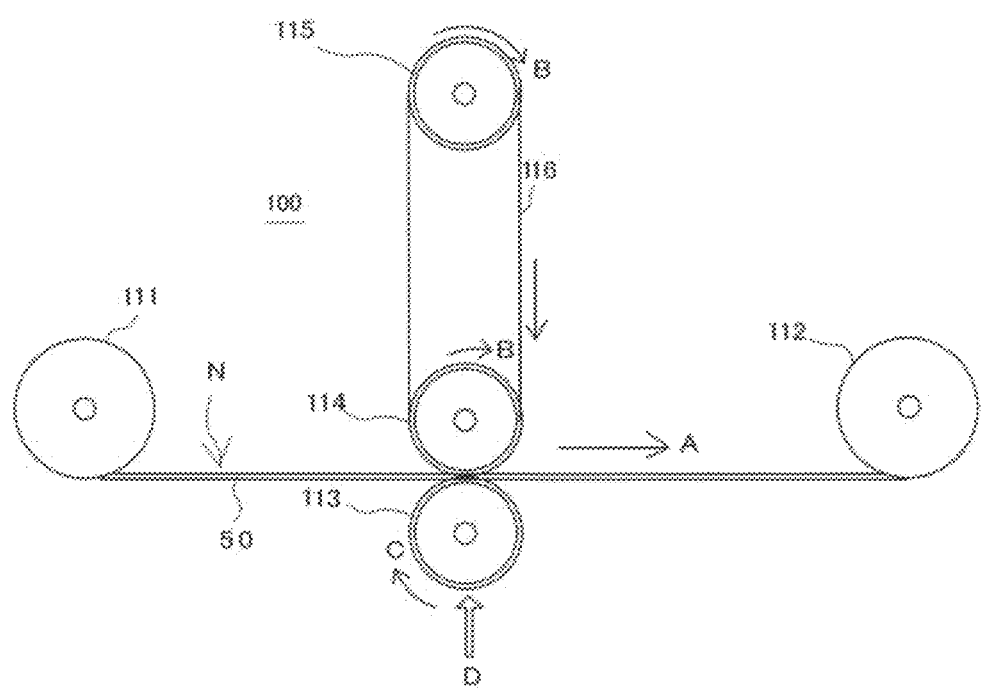
FIG. 9 is a schematic process diagram of a buffing process.

FIG. 9 shows an example of a schematic process diagram of a buffing process using a buffing apparatus 100 that buffs a surface N of a base material 50 of a fiber sheet on which a light-blocking layer is to be printed. As shown in FIG. 9, the buffing apparatus 100 includes a delivery roller 111 that delivers the base material 50, a take-up roller 112 that takes up the base material 50, a pressure-contact roller 113, a buff roller 114, a driving roller 115, and an abrasive belt 116. The base material 50 is transported toward the take-up roller 112 in an advancing direction A.

The abrasive belt 116 is an annular belt having a surface made of sandpaper, and is laid across the buff roller 114 and the driving roller 115. A rotational driving motor that drives a shaft (not shown) is connected to the driving roller 115, and the driving roller 115 is rotated by rotating the shaft, thus rotating the abrasive belt 116 laid across the buff roller 114 and the driving roller 115.

The buff roller 114 and the pressure-contact roller 113 are disposed so as to face to each other with the base material 50 interposed therebetween. The pressure-contact roller 113 is a rubber roller having a smooth circumferential surface. The pressure-contact roller 113 presses the base material 50 in a direction D. The pressure-contact roller 113 rotates in a rotational direction C, and the buff roller 114 rotates in a rotational direction B.

The base material 50 is delivered from the delivery roller 111 toward the take-up roller 112 in the direction A while a tension is applied thereto. Then, the base material 50 is delivered from the delivery roller 111, and is taken up by the take-up roller 112. During the process from the delivery to the taking up, the sandpaper of the rotating abrasive belt 116 laid on the buff roller 114 is brought into contact with the surface N of the base material 50 on which the light-blocking layer is to be printed, whereby the base material 50 is buffed.

The abrasive belt 116 includes, on the outer circumference thereof, sandpaper to which fine abrasive grains of about #120 to #600 are fixed.

The pressure in the direction D applied to the surface N of the base material 50 on which the light-blocking layer is to be printed is adjusted between the pressure-contact roller 113 and the buff roller 114, and thus the load current applied to the buff roller 114 is adjusted. When the load current is too low or too high, it is difficult to perform an operation with a stable current value.

The number of revolutions of the buff roller 114 depends on the diameter of the buff roller and the grit number of the sandpaper, but is preferably 300 to 1500 rpm, and more preferably 300 to 1000 rpm. The transport speed of the base material 50 also depends on the diameter of the buff roller and the grit number of the sandpaper, but is preferably 2 to 10 m/min, and more preferably 3 to 6 m/min.

When the base material 50 delivered from the delivery roller 111 is buffed, the shearing force applied by the abrasive belt 116 to the surface N of the base material 50 on which the light-blocking layer is to be printed is adjusted by changing the number of revolutions and the load current of the buff roller 114 and the transport speed of the base material 50. The shearing force is large when the number of revolutions and the current value of the buff roller 114, and the transport speed are large. The shearing force is small when these values are small.

Through the above-described buffing, the surface of the fiber sheet on which the light-blocking layer is to be printed is smoothed. The arithmetic mean height Sa, which is adjusted in the above-described manner, of the surface of the fiber sheet on which light-blocking layer is to be formed is 3 to 20 μm, and is preferably 3 to 12 μm, as measured based on ISO 25178. Note that the arithmetic mean height (Sa) as measured based on ISO 25178 is a parameter representing the mean of absolute values of the height differences of various points with respect to the mean plane of the surface.

When the arithmetic mean height Sa of the surface of the fiber sheet on which the light-blocking layer is to be formed exceeds 20 μm, the surface on which the light-blocking layer is to be printed is excessively fuzzed and thus lacks smoothness. Accordingly, the ink is diffused without being accurately absorbed into the printed surface during printing, so that the light-blocking layer formed has a nonuniform thickness, resulting in unevenness in light emission. When the arithmetic mean height Sa of the surface of the fiber sheet on which the light-blocking layer is to be formed is less than 3 μm, the anchor effect is less likely to be exhibited after application of the ink, and thus the fixability of the ink is reduced.

In this manner, a fiber sheet for forming a light-blocking layer is obtained. The thickness of the fiber sheet can be adjusted as appropriate according to the intended visible light transmittance and the usage, but is preferably 0.1 to 3 mm, more preferably 0.15 to 1 mm, and particularly preferably 0.2 to 0.9 mm. When the thickness of the fiber sheet is too large, the light transmission tends to be reduced.

Then, by printing the light-blocking layer on the surface of the obtained fiber sheet for which the arithmetic mean height Sa is adjusted to 3 to 20 μm, it is possible to obtain a light-blocking layer-equipped fiber sheet for use in a light-emitting display device configured to cover a light-emitting surface of a light-emitting member and selectively transmit light emitted by the light-emitting member so as to display a symbol such as a character and an icon, a pattern, and/or an image via light emission.

The light-blocking layer is formed by printing, using an ink, a symbol such as a character and an icon, a pattern, and/or an image that is to be displayed via light emission on a surface of the fiber sheet for which the arithmetic mean height Sa is adjusted to 3 to 20 μm. Examples of the printing method used for printing the light-blocking layer include screen printing, gravure printing, and inkjet printing. Among these, screen printing is preferable in that it allows the light-blocking layer to be stably coated by a relatively low-cost process and thus has excellent mass productivity in printing.

A pigment ink containing a pigment having a high concealing effect, such as carbon black or titanium oxide, and a binder such as an acrylic resin, or a dye ink containing a dark color dye can be used as the ink used for printing the light-blocking layer. The viscosity of the ink used for printing can be designed in a preferable range according to the printing method. For screen printing, the viscosity of a coating ink diluted with a solvent is preferably about 10 to 100 Pa·sec, from the viewpoint of an appropriate permeation into the fiber sheet.

The thickness of the light-blocking layer formed in this manner is preferably about 5 to 80 μm, and more preferably about 20 to 50 μm.

As described in relation to the light-emitting display device 20 according to the second embodiment and the light-emitting display device 30 according to the third embodiment, the light-transmissive surface resin layer 4 may be formed on the second surface of the fiber sheet 11.

The surface resin layer 4 is a light-transmissive resin layer for providing an appearance having a design quality with a luxurious feel such as a grain-finished leather-like feel, a wooden feel, a stony feel, and a metallic feel. By forming the light-transmissive surface resin layer so as to be stacked on the second surface of the fiber sheet 11, which is located on the side of the outer surface and is not located on the side of the light-emitting surface, it is possible to impart an appearance having a design surface with a luxurious feel such as a grain-finished leather-like feel, a wooden feel, a stony feel, and a metallic feel to the light-emitting display device.

Examples of the method for forming the surface resin layer include a method in which a resin layer containing a light-transmissive elastic polymer such as polyurethane is formed on a surface of the fiber sheet using a method such as dry forming or direct coating. Dry forming is a method in which a resin film containing an elastic polymer is formed on a support base material such as release paper, subsequently an adhesive is applied to the surface of the resin film, which is then attached, and bonded through pressing if necessary, to the surface of the fiber sheet, and the release paper is released, to form a light-transmissive surface resin layer. Direct coating is a method in which a liquid resin or a resin solution containing an elastic polymer is directly applied to the surface of the fiber sheet, followed by curing, to form a surface resin layer.

Polyurethane, an acrylic elastic body, or the like can be used as the elastic polymer for forming the surface resin layer. As the surface resin layer, a light-transmissive surface resin layer is selected. The type of the elastic polymer for forming such a surface resin layer is not particularly limited. Specific examples thereof include various polyurethanes such as a polycarbonate-based polyurethane, a polyester-based polyurethane, and a polyether-based polyurethane; acrylic elastic bodies; polyurethane acrylic composite elastic bodies; polyvinyl chloride elastic bodies; and synthetic rubbers. These elastic polymers may be used alone, or in a combination of two or more. Among these, polyurethanes are preferable because of the excellent mechanical properties such as abrasion resistance and bending resistance. The thickness of the surface resin layer is not particularly limited, but is preferably about 20 to 200 μm, for example. The surface resin layer may be formed such that the napped fibers of the fiber sheet coexist therewith.

As for the light transmission of the surface resin layer, the visible light transmittance of the light-transmitting portion of the light-blocking layer-equipped fiber sheet is preferably 0.1% or more, more preferably 1.0% or more, particularly preferably 5.0% or more, and quite particularly preferably 10% or more.

The configuration of each of the above-described light-emitting display devices may be changed as appropriate according to the purpose and the usage. Specifically, for example, a transparent resin molded body may be integrated with a surface layer of the first surface of the fiber sheet, which is located on the side of the light-emitting surface. Specifically, the light-blocking layer-equipped fiber sheet may be disposed inside a cavity of an in-molding mold such that the second surface, which is not located on the side of the light-emitting surface, faces toward the cavity surface, and injection molding for injecting the transparent resin into the cavity may be performed, thus integrating a light-transmissive transparent resin molded body with the first surface that is the side of the light-emitting surface.

The light-emitting devices according to the embodiments described above can form a surface that provide light emission display for home electrical appliances, automobiles, aircrafts, vessels, and interior parts of buildings.

EXAMPLES

Hereinafter, the present invention will be described in further detail by way of examples. It should be appreciated that the scope of the invention is by no means limited to the examples.

First, the evaluation methods used in the present examples will be collectively described below.

(Arithmetic Mean Height Sa)

The arithmetic mean height Sa compliant with ISO 25178 of the printed surface of a light-blocking layer of each fiber sheet was measured using a non-contact surface roughness/shape tester "Digital Microscope VHX-6000" (manufactured by KEYENCE CORPORATION). Specifically, the printed surface of the light-blocking layer of the fiber sheet was brushed 10 times in a grain direction, using a polyester lint brush (Etiquette brush (registered trademark), commonly called a seal brush, manufactured by Nippon Seal Co., Ltd.). Over the range of 18 mm×24 mm of the brushed surface, distorted fringe images were captured using a 4-mega-pixel monochrome C-MOS camera at a magnification of 100× under structured illumination light emitted from a high-intensity LED. Then, the obtained images were subjected to analysis processing to determine an arithmetic mean height (Sa). The measurement was carried out three times, and the average values thereof were used as the numerical values.

(Apparent Density)

The thickness (mm) and the basis weight (g/m$^2$) were measured in accordance with JIS L 1913, and the apparent density (g/m$^2$) was calculated from the measured values.

(Fineness)

The fineness was calculated by taking a scanning electron microscope (SEM) photograph of a cross section of the napped artificial leather at a magnification of 3000×, measuring the cross-sectional areas of 10 randomly selected fiber cross sections, calculating an average value of the cross-sectional areas, and converting the value into a fineness based on the densities of the resins.

(Light Transmission)

The light transmission of the light-transmitting portion of the fiber sheet was evaluated based on a visible light transmittance that had been obtained by measuring transmittance for a visible wavelength range of 380 to 780 nm using a spectrophotometer U-4100 (Hitachi High-Tech Science Corporation), and calculating the average value.

(Coatability)

Using a black ink and a screen plate (T-270), a 100 mm square light-blocking layer having a thickness of about 20 μm was screen printed on a surface of each fiber sheet on which the light-blocking layer was to be printed, and the presence or absence of coating unevenness of the black ink was visually determined.

A: Uniformly applied

B: Had uncoated portion/coating unevenness (Light-Blocking Effect)

A light source was illuminated from the printed surface of the light-blocking layer-equipped fiber sheet that had been screen printed, and the degree of transmission of light as viewed from the opposite side was visually determined according to the following criteria. The light source had a brightness of 40 lumens, a circular shape having a diameter of 3.5 mm, and a distance of 1.0 mm from each sample.

A: No light was transmitted at all.

B: Light was transmitted to such a degree that the contour of the light source was not discernible.

C: Light was transmitted to such a degree that the contour of the light source was discernible.

Example 1

Ethylene-modified polyvinyl alcohol as a thermoplastic resin for a sea component and an isophthalic acid-modified polyethylene terephthalate having a Tg of 110° C. as a thermoplastic resin for an island component were molten separately. Then, each of the molten resins was supplied to a multicomponent fiber spinning spinneret having multiple nozzle holes disposed in parallel, so as to form a cross section on which 25 island component portions having a uniform cross-sectional area were distributed in the sea component. At this time, the molten resins were supplied while adjusting the pressure such that the mass ratio between the sea component and the island component satisfied Sea component/Island component=25/75. Then, the molten resin was discharged from the nozzle holes set at a spinneret temperature of 260° C.

Then, the molten resin discharged from the nozzle holes was drawn by suction using an air jet nozzle suction apparatus with an air stream pressure regulated so as to provide an average spinning speed of 3700 m/min, and thereby to spin island-in-the-sea conjugated filaments with an average fineness of 2.1 dtex. The spun island-in-the-sea conjugated long fibers were continuously piled on a movable net while being suctioned from the back side of the net. Then, in order to suppress the fuzzing on the surface, the island-in-the-sea conjugated filaments piled on the net were softly pressed with a metal roll at 42° C. Then, the island-in-the-sea conjugated filaments were removed from the net, and allowed to pass through between a grid-patterned metal roll having a surface temperature of 75° C. and a back roll, thereby hot pressing the filaments with a linear load of 200 N/mm. Thus, a filament web was obtained.

Next, an oil solution mixed with an antistatic agent was sprayed to the surface of the obtained filament web, and subsequently the filament web was laid in 10 layers using a cross lapper apparatus to form a superposed web, and an oil solution for preventing the needle from breaking was further sprayed thereto. Then, the superposed web was needle-punched to perform three-dimensional entangling, thus obtaining an entangled web.

The obtained entangled web was densified by being subjected to heat-moisture shrinking in the following manner. Specifically, water at 18° C. was uniformly sprayed in an amount of 10 mass % to the entangled web, and the entangled web was heated by being stood still in an atmosphere with a temperature of 70° C. and a relative humidity of 95% for 3 minutes with no tension applied, thereby heat-moist shrinking the entangled web so as to increase the apparent fiber density. Then, for further densification, the entangled web was pressed with a dry-heat roll.

Next, polyurethane was impregnated into the densified entangled web in the following manner. A polyurethane emulsion (solid content concentration: 30%) composed mainly of polycarbonate/ether polyurethane was impregnated into the densified entangled web. Then, water in the entangled web was dried in a drying furnace at 150° C., and the unfoamed polyurethane was further crosslinked.

The obtained composite of the polyurethane and the entangled web was immersed in hot water at 95° C. for 20 minutes to extract away the sea component contained in the island-in-the-sea conjugated filament, and then was dried in a drying furnace at 120° C. Thus, a fiber sheet base material having a thickness of about 1.50 mm.

Then, the fiber sheet base material having a thickness of about 1.50 mm was sliced in half. Then, a first surface of the fiber sheet base material, which is located on a side of a light-emitting surface of a light-emitting member, which will be described later, and on which the light-blocking layer was to be printed was buffed with sandpaper of #120 such that the surface was flat. The buffing conditions were set such that the rotational speed of a buff roller was 650±50 rpm, the rotational direction was a backward direction relative to the advancing direction of the fiber sheet, and the transport speed of the base material was set at 3 m/min, and buffing was performed twice such that the actual measured value of the thickness was a target thickness, which was 0.36±0.03 mm. The buffing for the second surface, which was not located on the side of the light-emitting surface of the light-emitting member, and that was located on the side of the outer surface of the light-emitting display device was performed under the same conditions as the first surface except that the sandpaper was changed to sandpaper of #240.

Then, the above-described fiber sheet was pressed, with the mold temperature of a manual pressing machine set at room temperature, and the surface pressure set at 8.8 MPa. Thus, a fiber sheet A was obtained.

The fiber sheet A was a fiber sheet that included a non-woven fabric including ultrafine fibers having a fineness of 0.08 dtex, and polyurethane impregnated into the non-woven fabric, and that had a thickness of 0.35 mm and an apparent density of 0.515 g/cm$^3$. The arithmetic mean height Sa of the surface of the fiber sheet A on which the light-blocking layer was to be printed was 8.8 μm, as measured based on ISO 25178, and the opposite surface thereof was formed as a suede-like napped surface having an arithmetic mean height Sa of 13.4 μm.

The results are shown in Table 1 below. The fiber sheet A was a fiber sheet that exhibited a favorable coatability and a high light-blocking effect.

TABLE 1

| | | Example No. | | | | | | | | | |
|---|---|---|---|---|---|---|---|---|---|---|---|
| | | 1 | 2 | 3 | 4 | 5 | Com. Ex. 1 | Com. Ex. 2 | Com. Ex. 3 | Com. Ex. 4 | Com. Ex. 5 |
| Fiber sheet | Type | A | B | C | D | E | F | G | H | I | J |
| | Sa of Printed surface (μm) | 8.8 | 5.6 | 4.2 | 17.8 | 9.1 | 8.6 | 21.7 | 24.2 | 34.5 | 2.5 |
| | Apparent density (g/cm$^3$) | 0.515 | 0.815 | 0.853 | 0.535 | 0.54 | 0.452 | 0.466 | 0.582 | 0.429 | 0.891 |
| | Thickness of fiber sheet (mm) | 0.35 | 0.23 | 0.22 | 0.36 | 0.45 | 0.41 | 0.41 | 0.41 | 0.57 | 0.21 |
| | Pressing conditions (MPa, temperature) | (8.8, room temperature) | (8.8, 110° C.) | (8.8, 140° C.) | (8.8, room temperature) | Not performed | Not performed | Not performed | Not performed | Not performed | (8.8, 110° C.) |

TABLE 1-continued

| | Example No. | | | | | | | | | |
|---|---|---|---|---|---|---|---|---|---|---|
| | 1 | 2 | 3 | 4 | 5 | Com. Ex. 1 | Com. Ex. 2 | Com. Ex. 3 | Com. Ex. 4 | Com. Ex. 5 |
| Buffing conditions for printed surface | Light-emitting surface side #120 Before pressing | Light-emitting surface side #120 Before pressing | Light-emitting surface side #120 Before pressing | Light-emitting surface side #120 After pressing | Light-emitting surface side #120 | Light-emitting surface side #120 | Light-emitting surface side #100 | Light-emitting surface side #100 | Light-emitting surface side #120 | Light-emitting surface side #120 Before pressing |
| Fineness (dtex) | 0.08 | 0.08 | 0.08 | 0.08 | 0.08 | 0.08 | 0.08 | 0.05 | 0.08 | 0.08 |
| Outer surface (second surface) | Suede | Suede | Suede | Suede | Surface resin layer | Suede | Suede | Suede | Surface resin layer | Suede |
| Light transmittance (%) | 9.5 | 8.8 | 8.6 | 9.3 | 1.1 | 9.7 | 8.9 | 8.3 | 0.3 | 8.5 |
| Coatability | A | A | A | A | A | A | B | B | B | B |
| Light-blocking effect | A | A | A | A | A | B | B | A | C | A |

Example 2

A fiber sheet B was produced in the same manner as in Example 1 except that the pressing temperature was changed to 110° C. from room temperature. The fiber sheet B was a fiber sheet that included a non-woven fabric including ultrafine fibers having a fineness of 0.08 dtex, and polyurethane impregnated into the non-woven fabric, and that had a thickness of 0.23 mm and an apparent density of 0.815 g/cm$^3$. The arithmetic mean height Sa of the surface of the fiber sheet B on which the light-blocking layer was to be printed was 5.6 μm, as measured based on ISO 25178, and the opposite surface thereof was formed as a suede-like napped surface having an arithmetic mean height Sa of 5.2 μm. The results are shown in Table 1. The fiber sheet B was a fiber sheet that exhibited a favorable coatability and a high light-blocking effect.

Example 3

A fiber sheet C was produced in the same manner as in Example 1 except that the pressing temperature was change to 140° C. from room temperature. The fiber sheet C was a fiber sheet that included a non-woven fabric including ultrafine fibers having a fineness of 0.08 dtex, and polyurethane impregnated into the non-woven fabric, and that had a thickness of 0.22 mm and an apparent density of 0.853 g/cm$^3$. The arithmetic mean height Sa of the surface of the fiber sheet C on which the light-blocking layer was to be printed was 4.2 μm, as measured based on ISO 25178, and the opposite surface thereof was formed as a suede-like napped surface having an arithmetic mean height Sa of 4.1 μm. The results are shown in Table 1. The fiber sheet C was a fiber sheet that exhibited a favorable coatability and a high light-blocking effect.

Example 4

A fiber sheet D was produced in the same manner as in Example 1 except that the printed surface was buffed with sandpaper of #120 after pressing. The fiber sheet D was a fiber sheet that included a non-woven fabric including ultrafine fibers having a fineness of 0.08 dtex, and polyurethane impregnated into the non-woven fabric, and that had a thickness of 0.36 mm and an apparent density of 0.535 g/cm$^3$. The arithmetic mean height Sa of the surface of the fiber sheet D on which the light-blocking layer was to be printed was 17.8 μm, as measured based on ISO 25178, and the opposite surface thereof was formed as a suede-like napped surface having an arithmetic mean height Sa of 14.1 μm. The results are shown in Table 1. The fiber sheet D was a fiber sheet that exhibited a favorable coatability and a high light-blocking effect.

Example 5

A solution of a polycarbonate-based, non-yellowing polyurethane resin was applied to a surface of release paper, and was dried at 80° C. for 10 minutes, to form a polyurethane film having a thickness of 30 μm. Then, a solution of a polycarbonate-based, non-yellowing, two-liquid curable polyurethane for forming an adhesion layer was further applied to a surface of the formed polyurethane film, and was dried at 50° C. for 3 minutes, to form an adhesion layer having a thickness of 70 μm. Thus, a flat resin layer having a thickness of 100 μm was formed.

Then, the grain-finished resin layer formed on the release paper was attached to the surface, which had an arithmetic mean height Sa of 13.4 μm, of the fiber sheet A obtained in Example 1, and the whole was heated at 80° C. for 2 minutes. Thus, a fiber sheet E of a grain-finished artificial leather that included the resin layer and had a thickness of 0.45 mm was prepared. The fiber sheet E was a fiber sheet in which the non-woven fabric into which the polyurethane had been impregnated had an apparent density of 0.540 g/cm$^3$. The arithmetic mean height Sa of the surface of the fiber sheet E on which the light-blocking layer was to be printed was 9.1 μm, as measured based on ISO 25178. The results are shown in Table 1. The fiber sheet E was a fiber sheet that exhibited a favorable coatability and a high light-blocking effect.

Comparative Example 1

A fiber sheet F was produced in the same manner as in Example 1 except that pressing was not performed. The fiber sheet F was a fiber sheet that included a non-woven fabric including ultrafine fibers having a fineness of 0.08 dtex, and polyurethane impregnated into the non-woven fabric, and that had a thickness of 0.41 mm and an apparent density of 0.452 g/cm$^3$. The arithmetic mean height Sa of the surface of the fiber sheet F on which the light-blocking layer was to be printed was 8.6 µm, as measured based on ISO 25178, and the opposite surface thereof was formed as a suede-like napped surface having an arithmetic mean height Sa of 12.4 µm. The results are shown in Table 1. Although the fiber sheet F had no coating unevenness and thus exhibited a favorable coatability, a slight leakage of light from the light-blocking layer was confirmed when light was emitted from the light source, and thus the fiber sheet had a low light-blocking effect.

Comparative Example 2

A fiber sheet G was produced in the same manner as in Example 1 except that pressing was not performed, and the first surface, which was the surface on which the light-blocking layer was to be printed, was buffed with sandpaper of #100 instead of being buffed with sandpaper of #120. The fiber sheet G was a fiber sheet that included a non-woven fabric including ultrafine fibers having a fineness of 0.08 dtex, and polyurethane impregnated into the non-woven fabric, and that had a thickness of 0.41 mm and an apparent density of 0.466 g/cm³. The arithmetic mean height Sa of the surface of the fiber sheet G on which the light-blocking layer was to be printed was 21.7 µm, as measured based on ISO 25178, and the opposite surface thereof was formed as a suede-like napped surface having an arithmetic mean height Sa of 12.7 µm. The results are shown in Table 1. The fiber sheet G was a fiber sheet that had coating unevenness and thus exhibited poor coatability. A slight leakage of light from the light-blocking layer was confirmed when light was emitted from the light source, and thus the fiber sheet also had a low light-blocking effect.

Comparative Example 3

A fiber sheet H was produced in the same manner as in Example 1 except that the production conditions for the fiber sheet base material were changed such that the fiber sheet H included a non-woven fabric including ultrafine fibers having a fineness of 0.05 dtex, and polyurethane impregnated into the non-woven fabric, that pressing was not performed, and that the first surface, which was the surface on which the light-blocking layer was to be printed, was buffed with sandpaper of #100 instead of being buffed with sandpaper of #120. The fiber sheet H was a fiber sheet that had a thickness of 0.41 mm and an apparent density of 0.582 g/cm³. The arithmetic mean height Sa of the surface of the fiber sheet H on which the light-blocking layer was to be printed was 24.2 µm, as measured based on ISO 25178, and the opposite surface thereof was formed as a suede-like napped surface having an arithmetic mean height Sa of 12.8 µm. The results are shown in Table 1. The fiber sheet H exhibited a favorable light-blocking effect, but had coating unevenness.

Comparative Example 4

A fiber sheet I, which was a 0.57 mm-thick grain-finished artificial leather that had an apparent density of 0.429 g/cm³ and included a polyurethane resin layer on a surface of a non-woven fabric into which polyurethane had been impregnated, was prepared. The arithmetic mean height Sa of the surface of the fiber sheet I on which the light-blocking layer was to be printed was 34.5 µm, as measured based on ISO 25178. The results are shown in Table 1. The fiber sheet I had coating unevenness. In addition, the boundary between the light-blocking layer and the light-transmitting portion was obscure when light was emitted from the light source, and thus the fiber sheet had a poor concealing effect.

Comparative Example 5

A fiber sheet J was produced in the same manner as in Example 2 except that a filling process of applying a small amount of polyurethane to the first surface, which was the surface on which the light-blocking layer was to be printed, in order to smooth the first surface was added after buffing. The fiber sheet J was a fiber sheet that included a non-woven fabric including ultrafine fibers having a fineness of 0.08 dtex, and polyurethane impregnated into the non-woven fabric, and that had a thickness of 0.21 mm and an apparent density of 0.891 g/cm³. The arithmetic mean height Sa of the surface of the fiber sheet J on which the light-blocking layer was to be printed was 2.5 µm, as measured based on ISO 25178, and the opposite surface thereof was formed as a suede-like napped layer having an arithmetic mean height Sa of 4.9 µm. The results are shown in Table 1. The fiber sheet J exhibited a favorable light-blocking effect, but had coating unevenness.

REFERENCE SIGNS LIST

1. . . . Fiber sheet
2. . . . Light-blocking layer
3. . . . Light-blocking layer-equipped fiber sheet
4. . . . Surface resin layer
5. . . . Light-emitting member
5a. . . . Light-emitting diode device (LED)
5b. . . . Circuit board
10. . . . Light-emitting display device according to first embodiment
11. . . . Fiber sheet
20. . . . Light-emitting display device according to second embodiment
30. . . . Light-emitting display device according to third embodiment
40. . . . Light-emitting display device according to fourth embodiment
50. . . . Base material
100. . . . Buffing apparatus
111. . . . Delivery roller
112. . . . Take-up roller
113. . . . Pressure-contact roller
114. . . . Buff roller
115. . . . Driving roller
116. . . . Abrasive belt
D. . . . Light-transmitting portion
E. . . . Light emission

The invention claimed is:
1. A light-emitting display device, comprising:
a light-emitting member; and
a light-blocking layer-equipped fiber sheet that covers a light-emitting surface of the light-emitting member,
wherein the light-blocking layer-equipped fiber sheet comprises a fiber sheet, and a light-blocking layer that is partially printed on at least one surface of the fiber sheet, and a light-transmitting portion on which the light-blocking layer is not formed,
the light-blocking layer has an arithmetic mean value of light transmittance for a visible wavelength range of 380 to 780 nm of 0.05% or less, and
the surface of the fiber sheet on which the light-blocking layer is formed has an arithmetic mean height Sa of 3 to 20 µm, as measured based on ISO 25178, and the fiber sheet has an apparent density of 0.5 g/cm³ or more.

2. The light-emitting display device according to claim 1, wherein the light-blocking layer is printed on a first surface of the fiber sheet, the first surface being located on a side of the light-emitting surface.

3. The light-emitting display device according to claim 1, wherein the light-blocking layer-equipped fiber sheet has, on a second surface of the fiber sheet, a napped surface formed by napping fibers of a surface layer of the fiber sheet, the second surface not being located on the side of the light-emitting surface.

4. The light-emitting display device according to claim 1, wherein the light-blocking layer is printed on a second surface of the fiber sheet, the second surface not being located on the side of the light-emitting surface.

5. The light-emitting display device according to claim 1, wherein the light-blocking layer is printed on both a first surface and a second surface of the fiber sheet, the first surface being located on the side of the light-emitting surface, and the second surface not being located on the side of the light-emitting surface.

6. The light-emitting display device according to claim 1, wherein the light-blocking layer-equipped fiber sheet further comprises a light-transmissive surface resin layer on a second surface of the fiber sheet, the second surface not being located on the side of the light-emitting surface.

7. The light-emitting display device according to claim 1, wherein the fiber sheet includes a non-woven fabric of ultrafine fibers having a fineness of 1 dtex or less, and 3 to 40 mass % of an elastic polymer impregnated into the non-woven fabric.

8. The light-emitting display device according to claim 1, wherein the light-transmitting portion has an average value of light transmittance for a visible wavelength range of 380 to 780 nm, of 5 to 15%.

9. A light-blocking layer-equipped fiber sheet for use in a light-emitting display device configured to cover a light-emitting surface of a light-emitting member and selectively transmit light emitted from the light-emitting member, to display a symbol, a pattern, and/or an image via light emission, the light-blocking layer-equipped fiber sheet comprising:
a fiber sheet having a first surface located on the side of the light-emitting surface, and a second surface located on a side of an outer surface of the light-emitting display device; and
a light-blocking layer that is partially printed on at least one of the first surface and the second surface, and a light-transmitting portion on which the light-blocking layer is not formed,
wherein the light-blocking layer has an arithmetic mean value of light transmittance for a visible wavelength range of 380 to 780 nm of 0.05% or less, the surface of the fiber sheet on which the light-blocking layer is formed has an arithmetic mean height Sa of 3 to 20 µm, as measured based on ISO 25178, and the fiber sheet has an apparent density of 0.5 g/cm³ or more.

10. The light-emitting display device according to claim 2, wherein the light-blocking layer-equipped fiber sheet further comprises a light-transmissive surface resin layer on a second surface of the fiber sheet, the second surface not being located on the side of the light-emitting surface.

11. The light-emitting display device according to claim 10, wherein the light-blocking layer-equipped fiber sheet has a light-transmitting portion having an average value of light transmittance for a visible wavelength range of 380 to 780 nm, of 5 to 15%.

12. The light-emitting display device according to claim 11, wherein the fiber sheet includes a non-woven fabric of ultrafine fibers having a fineness of 1 dtex or less, and 3 to 40 mass % of an elastic polymer impregnated into the non-woven fabric.

13. The light-emitting display device according to claim 10, wherein the fiber sheet includes a non-woven fabric of ultrafine fibers having a fineness of 1 dtex or less, and 3 to 40 mass % of an elastic polymer impregnated into the non-woven fabric.

14. The light-emitting display device according to claim 2, wherein the light-blocking layer-equipped fiber sheet has, on a second surface of the fiber sheet, a napped surface formed by napping fibers of a surface layer of the fiber sheet, the second surface not being located on the side of the light-emitting surface.

15. The light-emitting display device according to claim 14, wherein the light-blocking layer-equipped fiber sheet has a light-transmitting portion having an average value of light transmittance for a visible wavelength range of 380 to 780 nm, of 5 to 15%.

16. The light-emitting display device according to claim 15, wherein the fiber sheet includes a non-woven fabric of ultrafine fibers having a fineness of 1 dtex or less, and 3 to 40 mass % of an elastic polymer impregnated into the non-woven fabric.

17. The light-emitting display device according to claim 14, wherein the fiber sheet includes a non-woven fabric of ultrafine fibers having a fineness of 1 dtex or less, and 3 to 40 mass % of an elastic polymer impregnated into the non-woven fabric.

* * * * *